United States Patent [19]

Jozat

[11] 4,106,031
[45] Aug. 8, 1978

[54] AUTOMATIC DRAFTING DEVICE

[75] Inventor: Walter Jozat, Bad Bramstedt, Fed. Rep. of Germany

[73] Assignee: Koh-I-Noor Rapidograph, Inc., Bloomsbury, N.J.

[21] Appl. No.: 781,394

[22] Filed: Mar. 25, 1977

[30] Foreign Application Priority Data

Mar. 30, 1976 [DE] Fed. Rep. of Germany ....... 2613440

[51] Int. Cl.² .......................................... G01D 15/16
[52] U.S. Cl. ................................ 346/140 R; 346/141
[58] Field of Search ................ 346/140 R, 140 A, 141

[56] References Cited

U.S. PATENT DOCUMENTS

| | | | |
|---|---|---|---|
| 1,766,249 | 6/1930 | Finch | 178/96 X |
| 2,926,058 | 2/1960 | Phillips, Jr. | 346/111 |
| 2,963,337 | 12/1960 | Spalek | 346/140 R |
| 3,346,869 | 10/1967 | Stone | 346/140 R X |
| 3,824,603 | 7/1974 | Bates et al. | 346/140 R X |
| 3,839,721 | 10/1974 | Chen et al. | 346/140 R X |
| 3,864,695 | 2/1975 | Nagashima et al. | 346/140 R X |
| 3,945,734 | 3/1976 | Woodbridge | 401/108 X |

*Primary Examiner*—George H. Miller, Jr.
*Attorney, Agent, or Firm*—David H. Semmes

[57] ABSTRACT

Automatic drafting device of the type employing a tubular writing pen, particularly an adjustable sealing element which is used against the writing tip of the pen when the pen is in a retracted rest mode. The sealing element is laterally disengaged from the pen tip when the pen is an extended writing mode. The sealing element which may be in the form of an elastic spheroid prevents drying out of ink within the capillary channel when the pen is not in use.

10 Claims, 1 Drawing Figure

U.S. Patent     Aug. 8, 1978     4,106,031
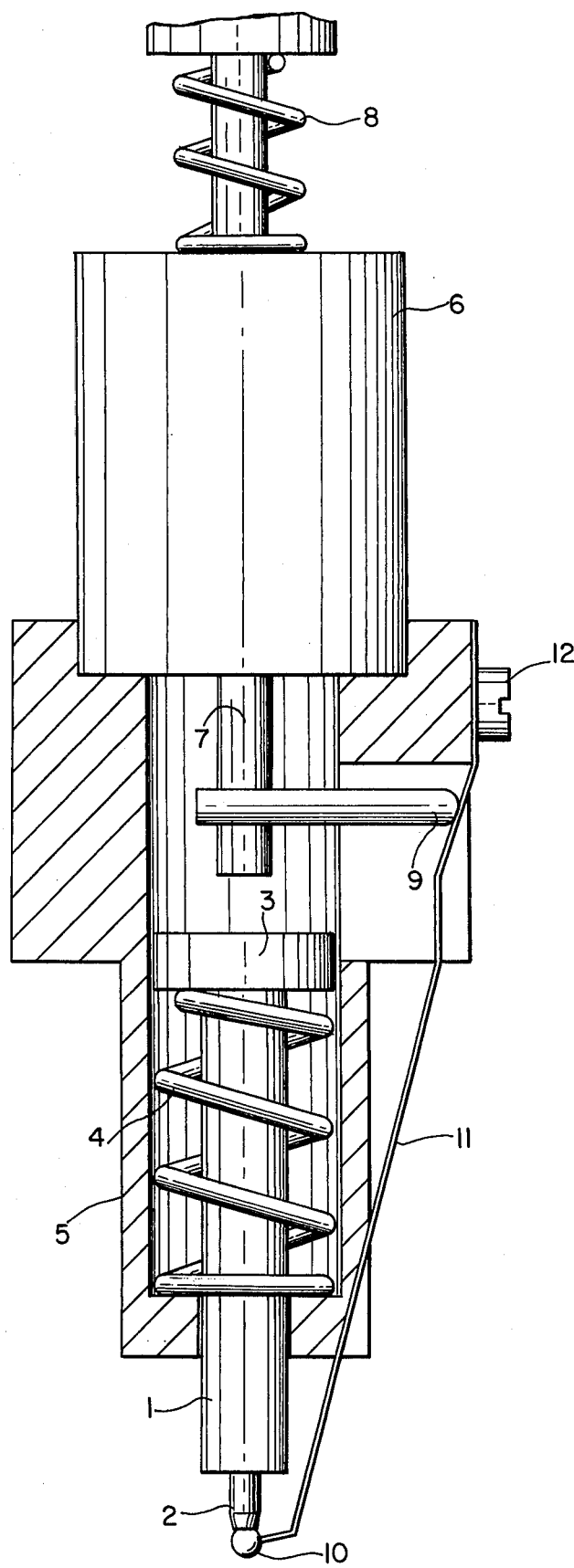

AUTOMATIC DRAFTING DEVICE

CROSS-REFERENCES TO RELATED APPLICATIONS

This application corresponds to the applicants' earlier filed West German application entitled AUTOMATIC DRAFTING DEVICE (Ser. No. P 26 13 440.7, filed Mar. 30, 1976).

BACKGROUND OF THE INVENTION

1. Field of the Invention

Automatic drafting instruments of the type supporting one or more tubular writing pens in either a lowered writing position with the pen tip contacting the writing surface or an upper rest position with the pen tip out of contact with the writing surface. A problem encountered in such mechanisms is drying of ink within the pen tip when the tubular writing pen is in the retracted or rest mode. As a result of the drying ink, such a pen when returned to the lowered writing mode will draft irregular lines during initial operation.

2. Description of the Prior Art

Accordingly, it has been an object of the prior art to provide automatic drafting devices with means which will prevent drying out of ink within tubular writing pens.

SUMMARY OF THE INVENTION

The invention deals with an automatic drafting device, having at least one tubular writing pen adjustably supported within a housing in both a raised or rest position wherein the tip of the writing pen is removed from a writing surface and a lowered or drawing position wherein the tip of the writing pen is in contact with the writing surface.

Many such automatic drafting devices are known (i.e. West German DT-OS No. 2,235,737), and it is possible to support more than one tubular pen within such a drafting device in order to have the capability of drawing varying line widths without the necessity for removing and inserting a different pen in the device. Thus, with the presence of several tubular pens in the automatic drafting device, it is only necessary to advance one of the tubular pens into the drawing position, while the remaining tubular pens remain in the retracted or rest position.

As is the case with automatic drafting devices having a single tubular pen, as well as those having several tubular pens, there is the danger that the ink in the capillary tube of the tubular pen will dry out if, during a pause in the drawing operation or with the selection of another pen, an individual pen is maintained for an extended period of time in the retracted or rest position. Such a drying out has as its consequence that upon lowering of the tubular pen into the drawing position, the pen will not immediately draw with full line width, thereby clearly hindering the automatic operation of the drafting device. Therefore, there is a need for an automatic drawing device which will prevent the drying out of the ink in the capillary channel or writing tube.

In an automatic drafting device of the aforementioned type, this task will be fulfilled through a sealing-element which closes off and seals the writing tip of the pen when not in use. In the lowered or drafting position of the tubular pen, this sealing-element preferably is tilted to one side in relation to the writing-tube, so that the drafting operation will not be hindered.

Therefore, in an appropriately designed drafting device with the tubular pen or tubular pens in the raised-up or rest position, there will be a sealing of the writing tube corresponding to the sealing which is effected conventionally either in take-up quivers or by means of individual sealing-caps for conventional tubular pens; however, neither quivers nor individual sealing caps are possible with automatic drafting devices. By means of the present sealing-element, it is ensured that each tubular pen will always be ready to draft, even after considerable time in the rest or retracted position. Accordingly, operation of the drafting device is not impeded by drying of ink within the capillary channel.

In the present automatic drafting device the tubular pen is maintained in the rest position by spring pressure and forced into the lowered or drafting drawing position by a reciprocable solenoid plunger mounted within a writing-head housing. The sealing element is preferably connected laterally to the solenoid plunger. To achieve this coupling, the sealing element may be fastened to a spring lever which is connected at one end to the housing. The lever may fit against a crosspin connected to the solenoid plunger in order that the descent of the solenoid will also move the cross-pin downwards and thus move the lever laterally outwardly so that the sealing-element swivels outwardly from the writing tip, as the tubular pen is lowered into the drafting position.

In a preferred design the sealing-element will consist of an elastic substance and will have the shape of a spherical segment whose spherical surface may be brought into contact with the front end or writing tip of the writing tube or capillary channel. The elastic substance should be of especially low wettability and may be a silicone rubber, for example.

By means of this sealing element assembly, on the one hand, secure sealing of the writing tube will be achieved, as the sealing element is elastically urged against the front end of the writing tube. On the other hand, the sealing element ensures that the ink which will eventually stick and dry onto the elastic substance will crumble and break away as the spherical segment returns to its original shape, as it is freed from the writing tube; thus the sealing element will not be soiled nor rendered unusable due to a deposit of dried ink residue.

BRIEF DESCRIPTION OF THE DRAWINGS

FIG. 1 is a vertical elevation, partially in section, showing a tubular writing pen supported within the housing in a retracted or rest mode with the sealing element engaging the pen tip.

DESCRIPTION OF THE PREFERRED EMBODIMENTS

In FIG. 1 there is shown writing head or housing 5 of an automatic drafting device which is not shown. Tubular pen 1 having a writing tube 2 arranged in its forward end is reciprocably supported within housing 5. The back end or top of the tubular pen is provided with a plate 3 so that spring 4, surrounding the top urges tubular pen 1 upwardly through the mechanism and against plate 3 and to a stationary position in writing head 5 as in the rest or retracted position represented in the figure. A solenoid 6 is positioned in the upper end of the writing head 5 which includes a maneuverable control piston 7. Piston 7 is pushed into a raised position by the spring 8 when current is not passing through the solenoid.

When the tubular pen is to be moved into the lowered or drawing position, solenoid 6 will thus be energized and piston 7 will move downwardly towards plate 3, whereby the tubular pen will be pressed downwards against the pull of the spring 4 until the forward end or writing tip of the writing tube 2 will be in contact with the drawing base or writing surface and the drawing operation can be carried out.

As soon as the solenoid 6 is currentless, the tubular pen will return through the force of the spring 4 to the depicted rest or retracted position.

Spring lever 11 supports sealing element 10 on its lower end. Sealing element 10, consisting of an elastic substance in the shape of a spherical segment, secured to spring lever 11, in turn, fastened to housing 5 by means of set screw 12 or the like. As indicated, lever 11 is curved so that it laterally avoids the bottom part of the writing housing 5.

In addition there is cross pin 9 located on piston 7. Cross pin 9 is in contact with the spring lever 11 when piston 7 is in the depicted raised up or rest position. If current is passed through the solenoid 6 and piston 7 therby moved downwardly, cross pin 9 presses the obliquely extending flexible lever 11 outwardly so that the sealing element 10 leaves the proximity of the tip of tubular pen 2 which can then be lowered into the drafting position without hinderance.

As soon as current is no longer passed through solenoid 6 and piston 7 is thereby raised due to the compression of spring 8, the tubular pen, as previously mentioned, returns to its raised up or rest position and lever 11, furthermore, returns again to the rest position represented in the figure in which the sealing element 10 closes off and seals the bottom end or tip of the writing tube 2. In this way, ink within the writing tube is prevented from drying out when the tubular pen is in the raised up or rest position. The elastic sealing substance should preferably have a low wettability in order to prevent ink from adhering to its surface. A suitable material is, for example, silicone rubber.

Nevertheless, should ink dry upon the surface of the sealing element 10 while it is in the depicted position, this dried-on ink will be automatically removed when lever 11 is moved laterally by cross pin 9. When sealing element 10 no longer is in contact with writing tube 2, which elastically depressed the sealing element in order to attain a seal, the sealing element springs back to its original spherical segment shape. The dried-on ink residue is peeled away from the surface of the sealing element 10 through this motion, and the sealing element may be utilized for the next sealing operation without hinderance.

We claim:

1. In an automatic drafting device of the type adjustably supporting a tubular writing pen with writing tip in both a lowered writing position with the pen tip contacting the writing surface and a raised rest position with the pen tip out of contact with the writing surface, the improvment comprising:
    A. A housing support for said tubular pen;
    B. A rest mode mechanism mounted upon said housing and engaging said pen, so as to urge said pen inwardly of said housing into a raised rest position;
    C. A writing mode mechanism mounted upon said housing and engaging said pen, so as to urge said pen outwardly of said housing in a lowered writing position; and
    D. A sealing element supported upon said housing, so as to engage the writing tip of said pen in the raised rest position and so as to disengage laterally from the writing tip in a lowered writing position.

2. The improvement in an automatic drafting device as in claim 1, wherein said sealing element is mounted upon a flexible, axially extending lever.

3. The improvement in an automatic drafting device as in claim 2, including:
    E. Cam means supported in said housing so as to abut said axially extending lever and, thereby, laterally disengage said sealing element from the writing tip, as said tubular pen is lowered into writing position.

4. The improvement in an automatic drafting device as in claim 3, said cam being affixed to said solenoid plunger and extending radially outwardly of said housing to engage said axially extending lever.

5. The improvement in an automatic drafting device as in claim 3, said rest mode mechanism including a spring override encircling said tubular pen within said housing and abutting an upper end of said pen, so as to urge said pen inwardly of said housing.

6. The improvement in an automatic drafting device as in claim 5, including:
    F. A plunger mechanism supported within said housing and operably engaging said tubular writing pen, so as to urge said pen outwardly of said housing in a lowered writing position.

7. The improvement in an automatic drafting device as in claim 6, said flexible axially extending lever being mounted at one end on the side of said housing and extending substantially axially towards said writing tip, so as to urge said sealing element against said writing tip, as said tubular pen is withdrawn into said housing.

8. The improvement in an automatic drafting device as in claim 7, wherein said sealing element is an elastic of spherical configuration.

9. The improvement in an automatic drafting device as in claim 7, said plunger being in the form of an electrically energized solenoid.

10. The improvement in an automatic drafting device as in claim 9, including an auxiliary spring override urging said solenoid plunger downwardly to engage said tubular pen and to lower said writing pen tip into writing position.

* * * * *